(12) United States Patent
Fenger

(10) Patent No.: US 11,092,139 B2
(45) Date of Patent: Aug. 17, 2021

(54) ROTOR BLADE REPLACEMENT SYSTEM

(71) Applicant: LIFTRA IP APS, Aalborg SV (DK)

(72) Inventor: Per Eske Fenger, Terndrup (DK)

(73) Assignee: LIFTRA IP APS, Aalborg SV (DK)

( * ) Notice: Subject to any disclaimer, the term of this patent is extended or adjusted under 35 U.S.C. 154(b) by 169 days.

(21) Appl. No.: 16/334,838

(22) PCT Filed: Sep. 20, 2017

(86) PCT No.: PCT/DK2017/050301
§ 371 (c)(1),
(2) Date: Mar. 20, 2019

(87) PCT Pub. No.: WO2018/054440
PCT Pub. Date: Mar. 29, 2018

(65) Prior Publication Data
US 2019/0309732 A1    Oct. 10, 2019

(30) Foreign Application Priority Data
Sep. 24, 2016 (DK) .................................. 201670758

(51) Int. Cl.
*F03D 80/50*       (2016.01)
*F03D 13/10*       (2016.01)

(52) U.S. Cl.
CPC ............. *F03D 80/50* (2016.05); *F03D 13/10* (2016.05); *F05B 2230/61* (2013.01); *F05B 2230/70* (2013.01); *Y02E 10/72* (2013.01)

(58) Field of Classification Search
CPC ......... F03D 80/50; F03D 13/10; Y02E 10/72; F05B 2230/61; F05B 2230/70; Y02P 70/50
See application file for complete search history.

(56) References Cited

U.S. PATENT DOCUMENTS 8,083,029 B2 *   12/2011   Teichert ................. F03D 80/50
                                                    182/128
8,863,903 B2     10/2014   Besselink et al.
2009/0020361 A1 *  1/2009   Teichert .................... E04G 3/30
                                                    182/36

(Continued)

FOREIGN PATENT DOCUMENTS

DK     201400575 A1    4/2016
WO    2016138907 A1    9/2016

*Primary Examiner* — Rick K Chang
(74) *Attorney, Agent, or Firm* — David S. Safran; Roberts Calderon Safran & Cole, P.C.

(57) ABSTRACT

A rotor blade replacement system for mounting and/or unmounting of a rotor blade in a wind turbine, and a method for replacing, installing or detaching a rotor blade. The blade replacement system has first and second clamps for detachable attachment to a rotor blade at a first position near a rotor hub mounting end of the rotor blade and at a second position near the tip of the rotor blade. The clamps have substantially U-shaped frame elements with a fixed first leg and a second leg which is rotatably and lockably mounted to a base portion of the frame elements. The second leg is displaceable between open and closed positions by a first actuator. The U-shaped frame element at least partially encloses and clamps the rotor blade, wherein the first and second legs have at least one pulley for interacting with a wire from a winch placed on the ground.

8 Claims, 13 Drawing Sheets

(56) References Cited

U.S. PATENT DOCUMENTS

| | | | |
|---|---|---|---|
| 2009/0173573 A1* | 7/2009 | Teichert | ............... E04G 3/30 |
| | | | 182/19 |
| 2010/0139062 A1 | 6/2010 | Reed et al. | |
| 2011/0185571 A1 | 8/2011 | Maj et al. | |
| 2012/0217089 A1 | 8/2012 | Fenger | |
| 2014/0010658 A1 | 1/2014 | Nielsen | |
| 2015/0028608 A1 | 1/2015 | Wubbelmann | |

* cited by examiner

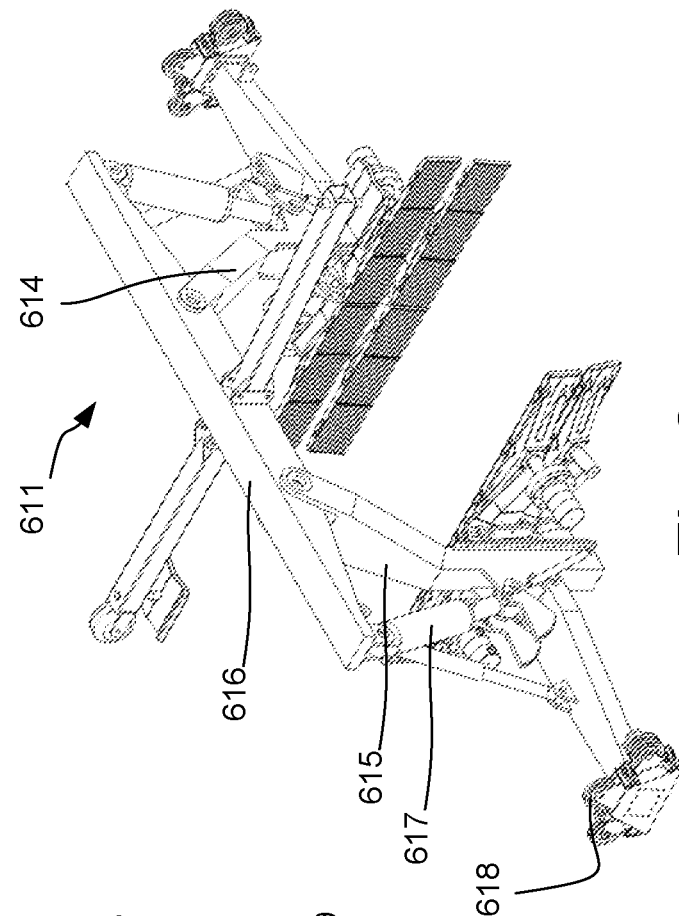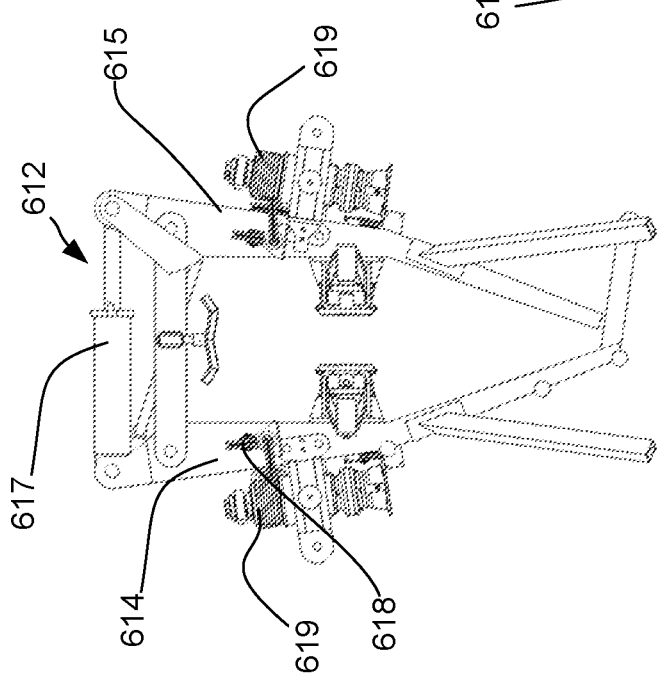

ROTOR BLADE REPLACEMENT SYSTEM

BACKGROUND OF THE INVENTION

Field of the Invention

The present invention relates to a rotor blade replacement system for mounting and/or unmounting of a rotor blade in a wind turbine, wherein said blade replacement system comprises a first clamp and a second clamp adapted to be detachably attached to a rotor blade at a first position close to the end of the rotor blade which is intended to be attached to the rotor hub and at a second position near the tip of the rotor blade.

Description of the Related Art

In the field of wind turbine rotor blade replacement systems, a larger need for quick and cost-efficient installation of rotor blades and replacement of faulty rotor blades has become present. As more and more wind turbines are installed, a higher demand is put on maintenance of the turbines. When traditionally installing or replacing rotor blades, a large crane has been required, typically larger than the wind turbine itself. As wind turbines are becoming increasingly larger and larger, these cranes become less mobile, and thus require a lot more time and space to install. Therefore, maintenance has taken a long time, where the wind turbine has been out of service, and thus not producing energy. Therefore, a new system for replacing rotor blades is needed. One such approach is the applicants own Danish Patent Application DK201400575A1, wherein a method and apparatus for replacing a rotor blade is described. While being a huge improvement over the systems using a large mobile or tower crane for rotor blade replacement and installation, this system has several disadvantages. One disadvantage of the prior art system is a lack of control of the hoisting process. While the rotor blade is moved between an installed position in the wind turbine, to a grounded position at the base of the wind turbine, or when hoisted from the grounded position, to a hoisted position, prior to installation, the rotor blade is hanging by a number of wires. The lower the number of wires, the less control there is of the rotor blade, when hoisting or lowering takes place. Another disadvantage is that the system is wind sensitive, and thus the rotor blade replacement or installation will often be delayed, due to high wind forces. Yet another disadvantage is the time required for setting up a rotor blade replacement system. Although the method and apparatus described in Danish Patent Application DK201400575A1 enables more time efficient rotor blade replacement than large mobile or tower based rotor blade replacement systems, it is a time-consuming operation, which could be improved.

SUMMARY OF THE INVENTION

It is an objective of the present invention to provide a rotor blade replacement system, by which it is possible to improve the problems of the prior art.

In a first aspect of the invention, these and further objects are obtain by a rotor blade replacement system of the kind mentioned in the introduction, wherein said first and second clamps comprise substantially U-shaped frame elements, said frame element having a first leg and a second leg, wherein said first and second clamps are displaceable between an open position and a closed position by a first actuator, wherein in the open position the intended rotor blade portion can pass towards the base portion of the frame elements, and wherein in the closed position, the second leg is displaced towards the first leg, wherein the U-shaped frame element at least partially encloses and clamps the rotor blade, wherein the first leg and the second leg of the first clamp intended to be mounted in the first position comprise at least one pulley adapted to interact with a wire from a winch placed on the ground, and wherein at least one of the clamps comprise at least one climbing hoist adapted to interact with a wire from the winch placed on the ground, and at least two hoist blocks being adapted to be mounted on the rotor hub or at least one rotor blade of the wind turbine.

There are several advantages of a rotor blade replacement system of the type according to the invention. One advantage is that a rotor blade can quickly and steadily be attached or detached from a wind turbine rotor hub, as well as moved between the ground and the rotor hub.

In the operation of a system according to the invention, each component will have a grounded position and a hoisted position. The grounded position is when the component is on or near the ground. An example of this is when the first clamp is mounted to a rotor blade which is placed on supports at the base of a wind turbine. Another example is when a hoist block is mounted to a wire from a ground based winch and is still near the base of a wind turbine.

The hoisted position of the components is when they are abutting, adjacent or near a nacelle, rotor hub or rotor blade (which is attached to the rotor hub). The hoisted position will be near the mounted position of the rotor blade. Thus, as an example the hoisted position of the first clamp is near its position, when the rotor blade it is attached to is mounted in the rotor hub.

It is clear to the person skilled in the art, which positions are grounded and which are hoisted, as these positions are separated by a vertical distance of at least 25 m.

In an embodiment, according to the invention, the first and second clamps comprise substantially U-shaped frame elements, the frame element having a first leg, which is fixed, and a second leg, which is rotatably and lockably mounted to a base portion of the frame elements, wherein said second leg is displaceable between an open position and a closed position by a first actuator, wherein in the open position the intended rotor blade portion can pass towards the base portion of the frame elements, and wherein in the closed position, the second leg is displaced towards the first leg, wherein the U-shaped frame element at least partially encloses and clamps the rotor blade, wherein the first, fixed leg and the second, rotatably lockable leg of the first clamp intended to be mounted in the first position comprise at least one pulley adapted to interact with a wire from a winch placed on the ground, and wherein at least one of the clamps comprise at least one climbing hoist adapted to interact with a wire from the winch placed on the ground, and at least two hoist blocks being adapted to be mounted on the rotor hub or at least one rotor blade of the wind turbine.

In an embodiment according to the invention, a resilient element, such as a wire, is adapted to run from at each of the at least two hoist blocks and around a rotor hub and/or rotor blade and connect to each of the at least two hoist blocks, so as to suspend the at least two hoist blocks under the rotor hub and/or rotor blade.

By using a system according to the embodiment, the forces experienced by the hoist blocks are distributed to the rotor hub and/or rotor blade.

In another embodiment of the invention, the rotor blade replacement system further comprises a platform which is adapted to be positioned under the rotor hub, such that a person standing on the platform can attach and/or detach fastening means, such as bolts, from a part of a wind turbine.

By using a system of this type, an operator can attach or detach parts of a wind turbine placed under the rotor hub. This is advantageous for some types of wind turbines, where the rotor blade is attached externally on the rotor hub, or for attaching/detaching rotor blade bearings, which are attached to the rotor hub from the exterior side.

Rotor blade bearings are generally attached to the rotor hub on the exterior face of the hub. The inner part of the bearing is generally attached to the rotor blade from the interior side of the rotor hub. By attaching/detaching rotor blade bearings from the exterior of the rotor hub by using a system according to the invention, comprising a platform, the process of attaching/detaching a rotor blade and a rotor blade bearing can be simplified and can also be performed quicker. This is advantageous for several reasons, but a safety aspect is clearly present. It is advantageous to assemble as much of the wind turbine at ground level, either at the site of the wind turbine, or at a remote site or factory. This is advantageous, as the number of attachment/detachment operations carried out at the top of a wind turbine is reduced. This is not only a safer working environment, but reduces the time for assembling the rotor blade and rotor blade bearing as this assembly is simplified at ground level for, among other obvious reasons, the mobility of the person assembling the rotor blade and rotor blade bearing.

As previously mentioned, the more time efficient the rotor blade replacement or installation process becomes, the more cost efficient will the process be, as the wind turbine is out of service for a shorter period of time.

In a further embodiment, the platform is attached to at least one of the hoist blocks or the first clamp adapted to be attached to a rotor blade in the first position.

This embodiment is advantageous, as the platform can be hoisted to a position near the rotor hub, when the component it is attached to is hoisted to the hoisted position. Thus, a hoisting operation is saved, which for large wind turbines is a time-consuming operation, as a crane hook will have to travel at lengths of hundreds of meters.

In one embodiment, it is preferred that the platform is attached to at least one of the hoist blocks, such that the when the at least one of the hoist blocks is hoisted to the hoisted position, the platform is hoisted together with the hoist block. Thus, when the hoist block is attached to the rotor hub and/or at least one rotor blade in its hoisted position, the platform can be further secured to the rotor hub and/or at least one rotor blade, for further safety for the operator who will work from the platform.

In another embodiment, it is preferred that the platform is attached to at least two of the hoist blocks. When using the system according to this at least two of the at least two hoist blocks will be hoisted from their grounded position to their hoisted position at the same time, and by attaching the platform to at least two hoist blocks, a further security is ensured, when hoisting the platform, as it is attached the two separate hoist blocks. A further advantage of using a system according to this embodiment, is that when the hoist blocks are mounted in their hoisted position, the platform is also in its hoisted position.

In yet another embodiment, the first clamp comprises at least one rigid fastening element to which the platform is attached. An advantage of using a system according to this embodiment is that the platform is hoisted together with the first clamp, and when hoisting a rotor blade from the ground to the hoisted position, the platform is hoisted together with the rotor blade. This is advantageous, as the platform does not need to be positioned around the rotor blade in the hoisted position, at a height of at least 25 meters above the ground, but can instead be accurately be positioned according to the rotor blade on the ground.

In an embodiment, the platform is adapted to enclose a rotor blade, such that a person can move around the entire circumference of the rotor blade, when attaching or detaching fastening means. This is advantageous when heavy equipment is to be used, or when hard to reach fastening means are to be attached or detached.

In a further embodiment, the platform consists of two platform sections, which each are adapted to at least partially enclose a rotor blade, and which when joined together are adapted to fully enclose a rotor blade.

In an even further embodiment, the two platform sections are hinged together, such that a person standing on one platform section can close the platform by swinging the other platform section around the hinge mechanism, thus fully enclosing a rotor blade.

This is advantageous, when a rotor blade is to be mounted to a rotor hub, as the rotor blade can be moved into the hoisted position, prior to the platform being closed around it.

In another embodiment, the platform is formed of at least three platform sections which are hinged together, such that a person standing on one platform section can close the platform by swinging the other platform sections around the hinge mechanisms, thus fully enclosing a rotor blade.

This is advantageous, as the platform can be formed in a symmetric manner, such that when hoisting the platform in two lifting points, the platform acts as a balanced load on the lifting apparatus.

In another embodiment, the platform comprises a fastening tool, which is movably mounted to a part of the platform, such that the operator does not have to lift and hold the fastening tool during attachment or detachment of fastening means.

This is advantageous when the fastening tool is large and/or heavy, which is often the case when dealing with fastening means, such as bolt, of a rotor blade bearing. Rotor blade bearings are typically attached to the rotor hub from the exterior, and attached to the rotor blade from the interior. The fastening means for these are typically large bolts, often being heavy and difficult to handle. Additionally, the fastening tools used for attaching/detaching these bolts are usually even heavier. Thus, when removing the bolts, it is advantageous that a fastening tool is moveably mounted to a part of the platform, such that it can be moved into position to fasten or unfasten the bolts without an operator having to lift the fastening tool.

In a further embodiment, the fastening tool is movably mounted, preferably slidably and rotatably mounted, to a railing of the platform.

An advantage of this embodiment is that it eases the use of the fastening tool, and thus reduces the requirements of the operator. By using a railing of the platform as a sliding surface of the fastening tool, the number of components is reduced, thus reducing the weight of the platform, which is of high importance in the field of rotor blade replacement systems.

In another embodiment, the platform is adapted to be fixed to a rotor hub and/or rotor blade by at least two resilient members, such as a strap, wire, rope or other like components, when the platform is in the hoisted position. This is advantageous for safety reasons, as the additional attachment of the platform to a rotor hub or a rotor blade ensures that the platform is always safely attached to the wind turbine.

In an embodiment, according to embodiments of the invention comprising a platform, the platform is adapted to, in its hoisted positon, to act as a guide for a rotor blade being hoisted to the rotor hub. As such, during the hoisting of the rotor blade, when approaching the rotor hub, the first end of the rotor blade will be guided be a part of the platform, which faces the center of the platform. In an embodiment, the platform comprises a central opening which is adapted to guide a first end of a rotor blade, when the rotor blade is hoisted to the rotor hub. The central opening can be formed as an opening in one part, or can be an opening defined by a number of connected platform sections.

An advantage of using the platform as a guiding element for a rotor blade is that the rotor blade can be installed more efficiently and at a quicker speed.

In an embodiment of the invention, the rotor blade replacement system comprises a jib crane comprising two jibs, extending from a same crane column, at an angle from each other, said jib crane being adapted to be mounted on a part of a wind turbine nacelle, and having a function of lifting other components of the rotor blade replacement system from a position on the ground to a position near the mounted state of the component.

This is advantageous when using systems having two like parts which are to be moved between the grounded position and the hoisted position and vice versa. In particular, for a system according to the invention, it is advantageous when moving two hoist blocks between the grounded position and the hoisted position and vice versa. Since the jib crane comprising two jibs can lift or lower two parts at the same time, the hoist blocks, which are to be lifted to and from their hoisted position, said hoisted positions being at the same height above the grounded position, can be lifted simultaneously. Therefore, the operation time can be lowered, and possibly be cut in half.

A further advantage of the jib crane comprising two jibs is that it can be mounted in its operating position, and during operation does not need to yaw between two or more positions during lifting of components. Thus, less wear occurs on the crane, and the operator does not need to precisely position the crane during operation.

In another embodiment according to the invention, the rotor blade replacement system further comprises a spacer element, adapted to be placed between two rotor blades of a wind turbine, wherein the spacer element is rigid and maintains a substantially constant distance between the rotor blades it is adapted to be placed between, wherein the spacer element comprises a center section and two guide sections, said guide sections being positioned at each end of the center section, and wherein one surface of each guide element is adapted to abut a rotor blade and another surface of each guide element is adapted to guide a wire from a winch placed on the ground and/or a wire from a winch attached to a wind turbine nacelle.

This is advantageous since any wire guided in the guide elements will stay at a fixed distance from each other, and therefore the system can operate at a much higher precision. A further advantage of having a spacer element comprising two guide elements is that as a single unit, it can be easily placed between two rotor blades, ensuring a substantially constant distance between the rotor blades, as well as wire guides, without having to precisely positioning a number of components. Rather a single unit can be placed. This is advantageous when used for wind turbines, as most precision placement requires an operator stand on a wind turbine rotor, which is to be avoided as much as possible, for safety reasons.

In yet another embodiment of the invention, the rotor blade replacement system comprises a hoist block tether attached at one end to a wire attached to a hoist block or attached to the hoist block itself, and wherein the hoist block tether is adapted to be attached to a stationary part of a wind turbine at the other end, such as a part of the nacelle, wherein the hoist block tether is configured to position the hoist block in relation to the rotor hub by adjusting the tension of the hoist block tether.

By using a system according to this embodiment, the hoist blocks can be positioned, by adjusting the tension on the tether. This is advantageous for positioning the first clamp in its hoisted position, either when the first clamp is clamping a rotor blade which is to be mounted in the rotor hub, or when the first clamp is moved into its hoisted position, prior to clamping of a mounted rotor blade. In particular, when the first clamp is not positioned around the center axis of the rotor blade, it is advantageous to adjust the position of the hoist block, such that when the first clamp is moved to its hoisted position, the center axis of the rotor blade will align with an opening in the rotor hub.

In one embodiment, the tether is connected to the hoist blocks from over the rotor hub, such that when tightening the tether, the hoist blocks will move towards the front of the rotor hub, and when the tether is loosened, the hoist blocks will move towards the wind turbine tower.

In an alternative definition of the above embodiment, a hoist block tether is attached at one end to a hoist blocks, and at the other end being fixed to a part of the wind turbine, such as the nacelle. The hoist block tether runs over a rotor blade fixed to the rotor hub and down to the hoist block.

By using a tether of this type, the hoist block position can easily and accurately be determined from a location a distance away from the hoist block, such as for example the position of the hoist block can be adjusted from the nacelle of the wind turbine. Thus, an operator can be safely placed in a position away from the rotor hub, when positioning the hoist blocks.

In a second aspect of the invention, a method for attaching and/or detaching a wind turbine rotor blade to a three-blade rotor hub is provided.

The method comprising the steps of:
a) lifting at least one hoist block and a wire from a winch placed on the ground to a position adjacent to one of a rotor hub, a wind turbine nacelle or a rotor blade.

For attaching:
b1) attaching a first clamp to a rotor blade near the end of the rotor blade which is fastened to the rotor hub,
c1) attaching a second clamp to a rotor blade near the tip of the rotor blade,
d1) running the wire from step a) through a number of pulleys on the first and second clamps,
e1) hoisting the rotor blade from the ground to an attachment position in the rotor hub,
f1) attaching the rotor blade and/or the rotor blade bearing to the rotor hub, by fastening means, such as bolts.

For detaching:
b2) running the wire from step a) through a number of pulleys on a first and second clamps, c2) hoisting the first and second clamp to the rotor blade to be detached,
d2) attaching the first and second clamp to the rotor blade to be detached,
e2) detaching the rotor blade and/or the rotor blade bearing to the rotor hub, by unfastening fastening means, such as bolts.
f2) hoisting the rotor blade to the ground from a position adjacent to the rotor hub.

In an embodiment, according to the second aspect of the invention, the method comprises that, during step a), the method further comprises lifting a platform together with the hoist block.

In an embodiment, according to the second aspect of the invention, the method comprises the step:
a') positioning each hoist block with a hoist block tether.

In a further embodiment of the invention, the method further comprises the step of, prior to step a):
a") attaching a jib crane comprising two jibs, extending from a same crane column, at an angle from each other, to a stationary part of a wind turbine, such as a part of the nacelle, In a further embodiment of the invention, the method further comprises the step of, prior to step a):
a''') placing a spacer element between the two rotor blades which are not to be attached and/or detached, In a further embodiment of the invention, during step e), the method is further defined by:
e') wherein the rotor blade is attached to a rotor blade bearing, which is to be attached to the rotor hub, In a further embodiment of the invention according to claim 9, wherein steps f1) or e2) of the method further comprises the step of standing on the platform.

The invention will be described in more detail below by means of non-limiting examples of presently preferred embodiments and with reference to the schematic drawings.

BRIEF DESCRIPTION OF THE DRAWINGS

FIG. 3a shows a detailed view of a rotor blade replacement system according to the first aspect of the invention;
FIG. 3b shows an end view of a second clamp;
FIG. 3c shows a perspective view of a first clamp;
FIG. 7b shows a detailed view of the rotor blade replacement system shown in FIG. 7a.

DETAILED DESCRIPTION OF THE INVENTION

Figure 1:
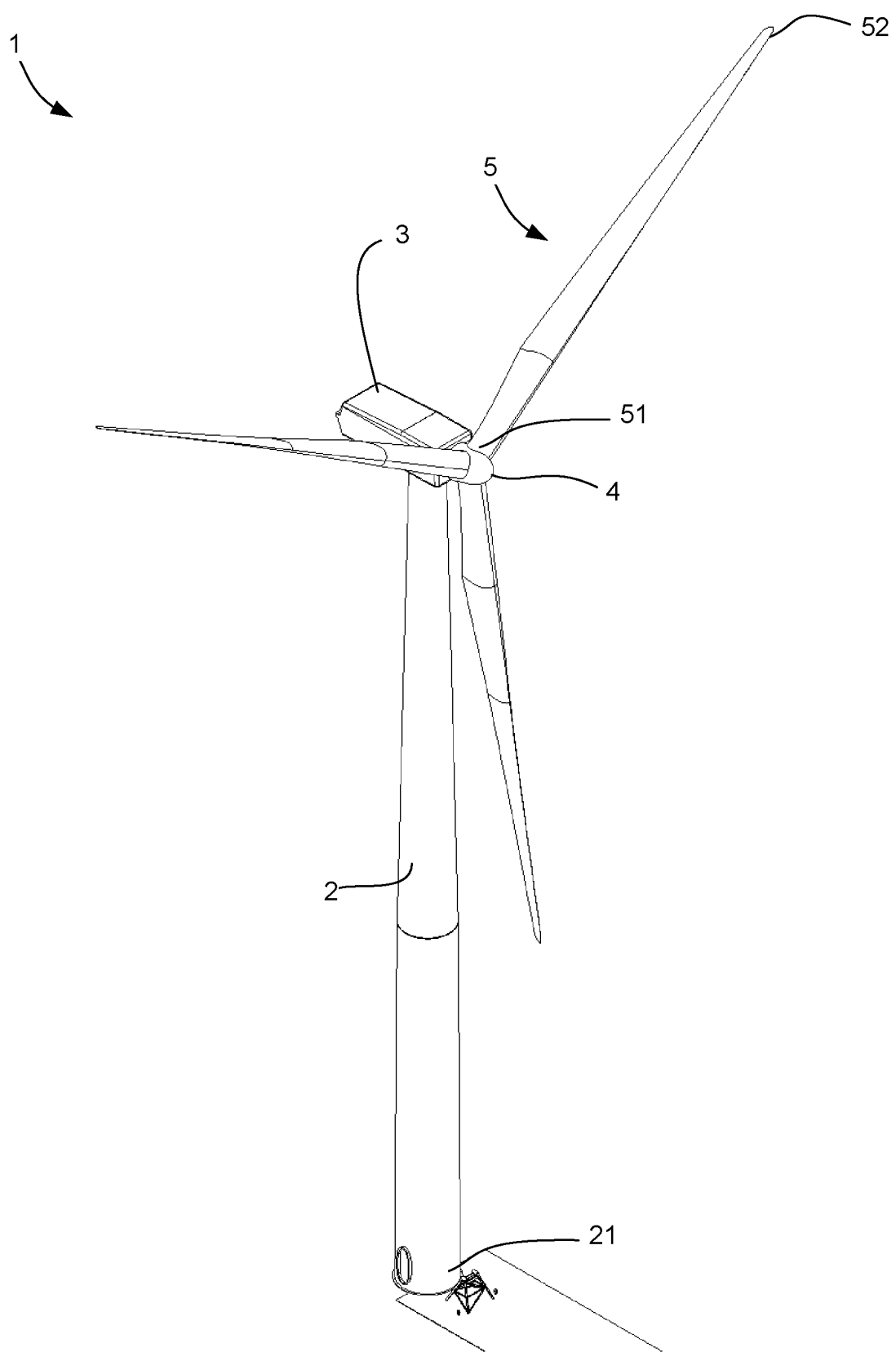
FIG. 1 shows a perspective view of wind turbine according to the prior art.

FIG. 1 shows a perspective view of a wind turbine 1 according to the prior art. The wind turbine 1 comprises a tower 2, having a tower base 21, the wind turbine 1 further comprising a nacelle 3 at the top of the tower 2, a rotor hub 4 which is attached to the nacelle 3. The Rotor hub is attached to three rotor blades 5, wherein the attachment between the rotor hub 4, Rotor blades 5 each comprise a rotor blade bearing 53, which allows the rotor blade 5 to rotate in the rotor hub 4, in order to effectively produce energy from the wind. Each rotor blade 5 further comprises a first end 51, which is the end which interacts with the rotor blade bearing 53 and the rotor hub 4. At the opposite end, the rotor blade has a second end 52, which is also known as the tip of the rotor blade.

During operation of a wind turbine 1, the rotor blades 5 and/or the rotor blade bearings 53 will wear, and thus will need replacement. In such situations, a rotor blade replacement system 6 according to the invention is suitable to use.

Figure 2:
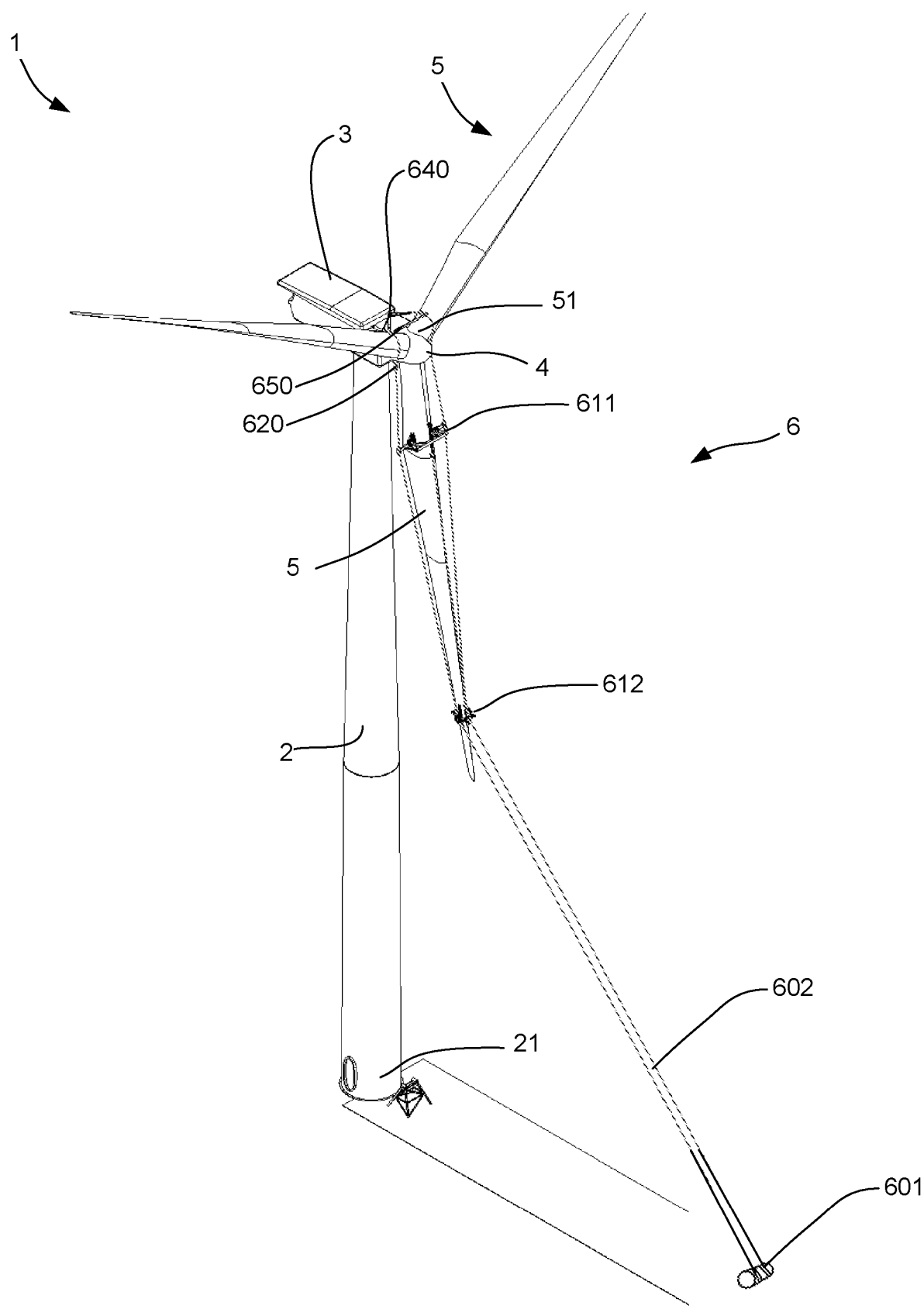
FIG. 2 shows a perspective view of a rotor blade replacement system according to a first aspect of the invention.

FIG. 2 shows a perspective view of a rotor blade replacement system 6 according to the first aspect of the invention. The rotor blade replacement system 6 is, however, also suitable for installation of rotor blades 5 in wind turbines 1 which have not yet had rotor blades 5 mounted. Further the rotor blade replacement system 6 is suitable for replacing rotor blade bearings 53 with or without replacing the attached rotor blade 5 with a new rotor blade 5.

The rotor blade replacement system 6 shown in FIG. 2 comprises first clamp 611, a second clamp 612 which are attached to a rotor blade 5 in a first position near the first end 51 of the rotor blade 5 and a second position near the second end 52 of the rotor blade 5, respectively. The rotor blade replacement system 6 further comprises a wire 602 which runs from a winch 601 placed on the ground through at least one pulley 618 of the second clamp 612, at least one pulley 618 of the first clamp 611, a climbing hoist 619 of at least one of the first 611 or second clamp 612 and a hoist block 620. The rotor blade 5 which the first clamp 611 and second clamp 612 are attached to be movable between a hoisted position near the rotor hub 4 and a grounded position near the base 21 of the tower by having the climbing hoist 619 winding or unwinding the wire 602. By winding or unwinding the wire 602 independently of the winch 601 placed on the ground, the climbing hoist 619 can control the position of the first and second clamps 611, 612 along the wire and the tension of the wire on both sides of the climbing hoist 619. Thus, the climbing hoist 619 can move the rotor blade 5 between its grounded position and its hoisted position.

In the embodiment shown in FIG. 2, the rotor blade replacement system 6 further comprises a crane 640 and a spacer element 650, which are both used for installation and positioning of the rotor blade replacement system 6, and in particular the positioning of the hoist blocks 620.

FIG. 3a shows a detailed view of a rotor blade 5 with a first clamp 611 and a second clamp 612 attached in the first and second position near the first end 51 and second end 52, respectively. The wire 602 is shown running between the first clamp 611 and the second clamp 612.

FIG. 3b shows a detailed view of the second clamp 612 which comprises substantially U-shaped frame elements having a base portion 616, a first, fixed leg 614 and a second rotatable and lockable leg 615, the first 614 and second leg 615 being attached to the base portion 616. A first actuator 617 is arranged between the first 614 and second leg 615 such as to actuate the rotational movement of the second leg 615. The second leg 615 is displaceable between an open position and a closed position by the first actuator 617, such that in the open position the rotor blade 5 portion near the tip 52 of the rotor blade 5 can pass towards the base portion 616 of the frame elements, and wherein in the closed position, the second leg 615 is displaced towards the first leg, wherein the first 614 and second leg 615 clamp the rotor blade 5 along with the base portion 616. The second clamp 612 further comprises a number of pulleys 18 for interaction with the wire 602 and two climbing hoist 619, one on each of the first leg 614 and second leg 615, for hoisting the second clamp between the grounded and hoisted position.

FIG. 3c shows a detailed view of the first clamp 611, the first clamp 611 comprises substantially U-shaped frame elements comprising a base portion 616, a first, fixed leg 614 and a second rotatable and lockable leg 615, the first 614 and second leg 615 being attached to the base portion 616. A first actuator 617 is arranged between the first 614 and second leg 615 such as to actuate the rotational movement of the second leg 615. The second leg 615 is displaceable between an open position and a closed position by the first actuator 617, such that in the open position the rotor blade 5 portion near the first end 51 of the rotor blade 5 can pass towards the base portion 616 of the frame elements, and wherein in the closed position, the second leg 615 is displaced towards the first leg, wherein the first 614 and second leg 615 clamp the rotor blade 5 along with the base portion 616. The first clamp 611 further comprises a number of pulleys 618 for interaction with the wire 602.

Figure 4:
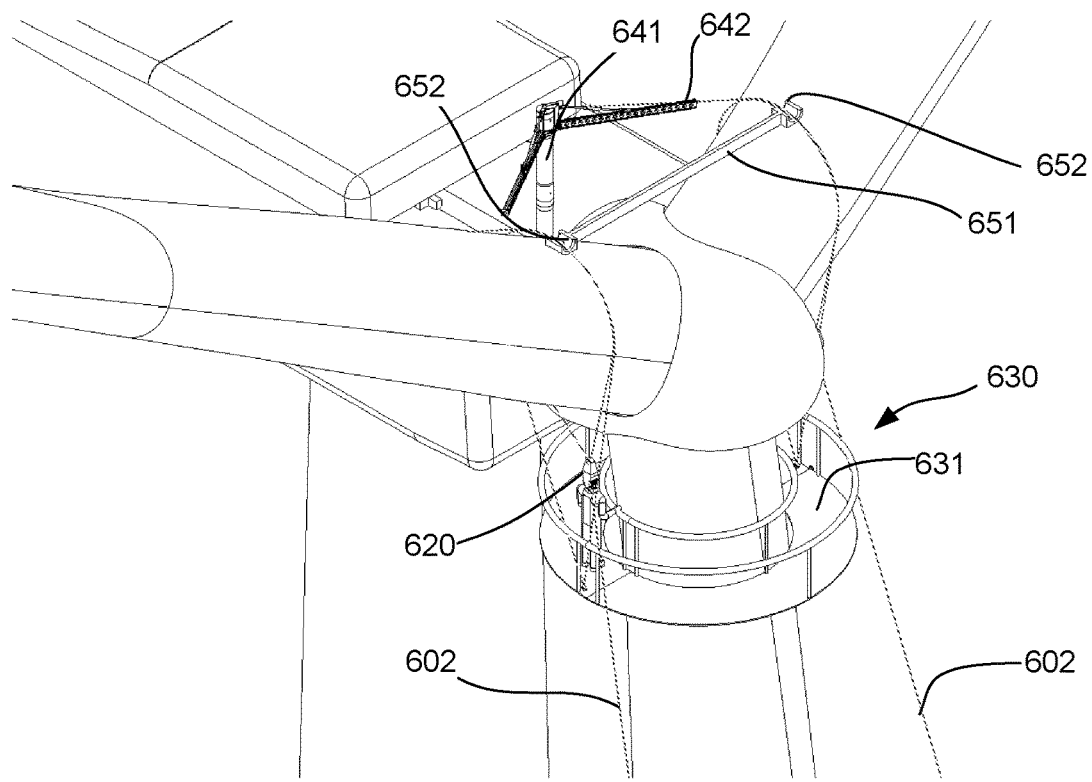
FIG. 4 shows a detailed view of a rotor blade replacement system according to an embodiment of the invention.
Figure 5:
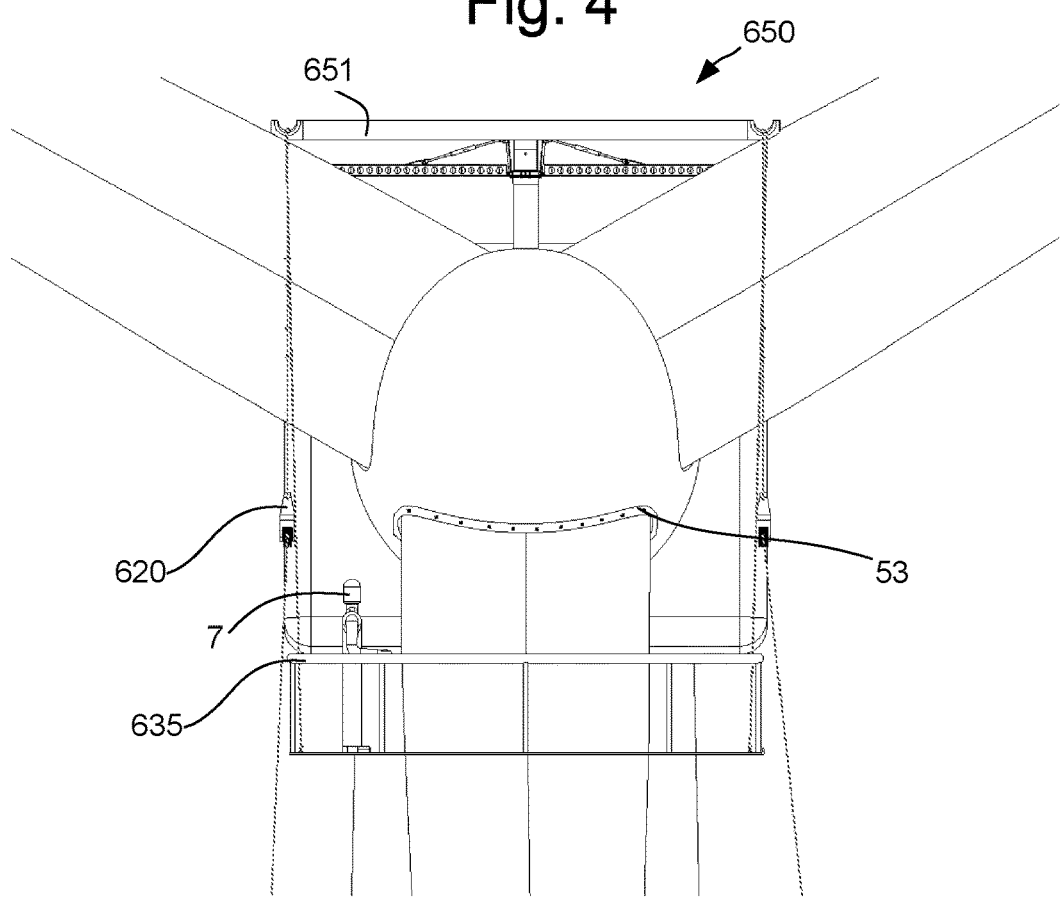
FIG. 5 shows a side view of a rotor blade replacement system according to an embodiment of the invention.

FIGS. 4 and 5 show detailed views of a rotor blade replacement system 6 according to an embodiment of the invention, which in the embodiment shown comprises a platform 630. The platform 630 is attached to a guide section 652 of a spacer element 650 and a rotor blade 5, which is fixed to the rotor hub 4. The platform 630 comprises a first platform section 631 and a railing 635, intended to act as a safety feature, to prevent an operator to fall from the platform. An operator 7 is shown in FIGS. 4 and 5 as an example of the use of the platform 630 of the rotor blade replacement system 6. From the platform 630, the operator 7 has access to the exterior of the rotor hub 4, where the rotor blade bearing 53 are attached to the rotor hub 4. Thus, the operator can attach or detach the fastening means connecting the rotor blade bearing 53 to the rotor hub 4.

Figure 6A:
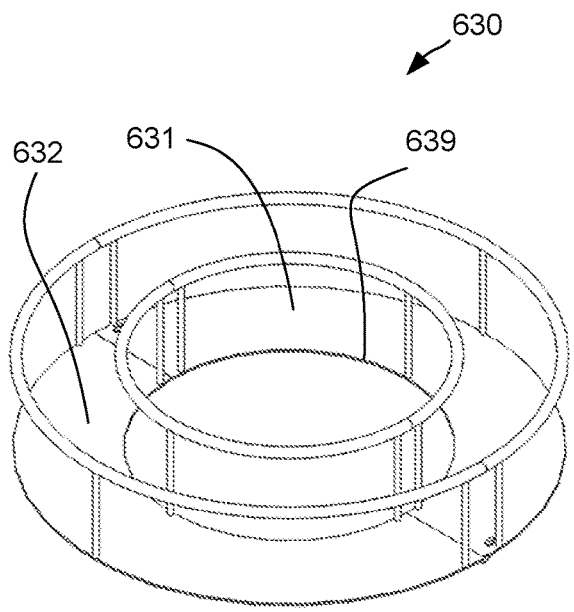
FIGS. 6a-d show detailed views of a platform according to embodiments of the invention.

FIGS. 6a to 6d show different embodiments of the platform 630 according to the invention. FIG. 6a shows a platform 630 in its closed configuration, which is the configuration it will be in when used for attachment or detachment of rotor blade bearings 53. The platform 630 comprises a first platform section 631 and a second section 632. In the closed configuration of the platform 630, its inner opening further acts as a guiding element 639 for the first end 51 of a rotor blade 5. Thus, when the platform 630 is in its hoisted position and is attached to a fixed rotor blade 5, the rotor blade 5 being hoisted by the first 611 and second clamps 612 will interact with the guiding element 639 of the platform 630 before reaching its hoisted position near the rotor hub 4, ready to be attached to the rotor hub 4. The guiding element 639 could further be formed as a funnel, which will further guide a first end 51 of a rotor blade 5 into its installation position at the rotor hub 4.

Figure 6B:
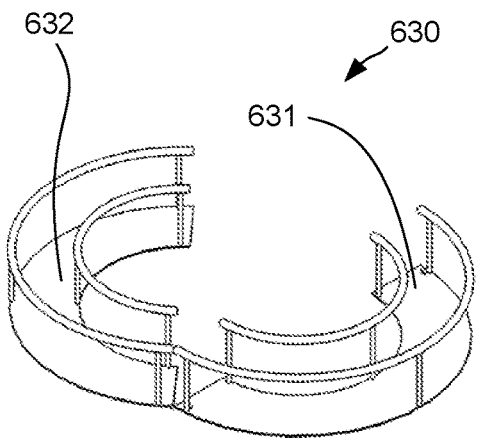

FIG. 6b shows the platform 630 of FIG. 6a in its open configuration, which is the configuration it will be in when hoisted for replacing a rotor blade 5 mounted to the rotor hub 4.

Figure 6C:
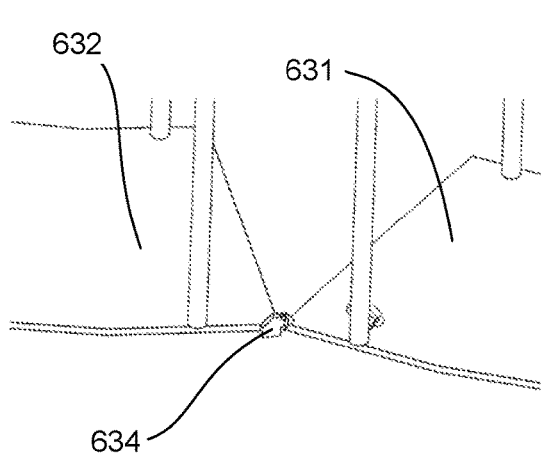

FIG. 6c shows a detailed view of the platform 630 of FIG. 6b in its open configuration, where the hinge 634 connecting the first platform section 631 and the second platform section 632 is shown. The hinge 634 could be formed in any other known hinge shape.

Figure 6D:
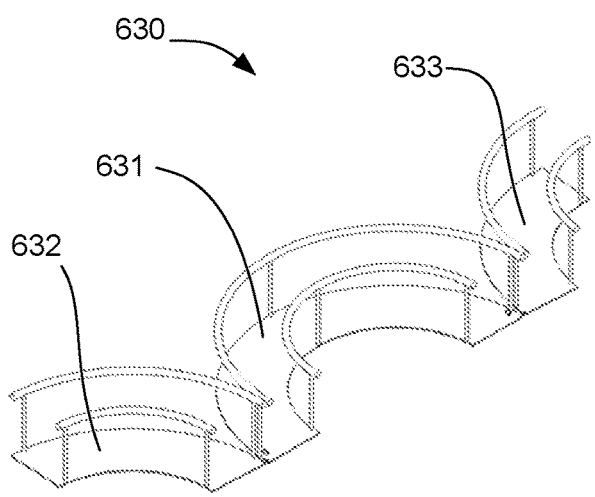

FIG. 6d shows an alternative platform 630 in its open configuration. The platform 630 comprises a first platform section 631 and two identical but mirrored second 632 and third platform sections 633, which are both connected to the first platform section 631 by hinges 634. This embodiment is particularly advantageous when the platform 630 is hoisted from the grounded position to the hoisted position in its open configuration.

Figure 7A:
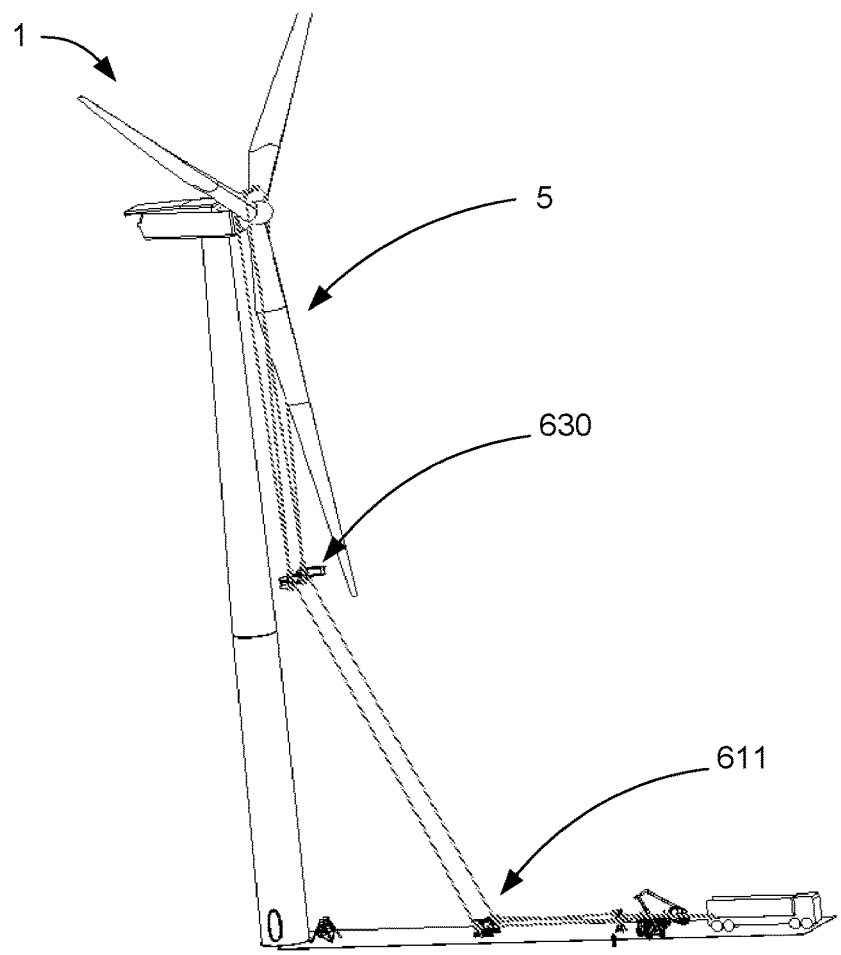
FIG. 7a shows a perspective view of a rotor blade replacement system according to an embodiment of the invention.

FIG. 7a shows a perspective view of a rotor blade replacement system 6 according to an embodiment of the invention comprising a platform 630. As seen in FIG. 7a, the platform is being hoisted from its ground position to its hoisted position around a rotor blade 5, which is fixed to the rotor hub 4.

Figure 7B:
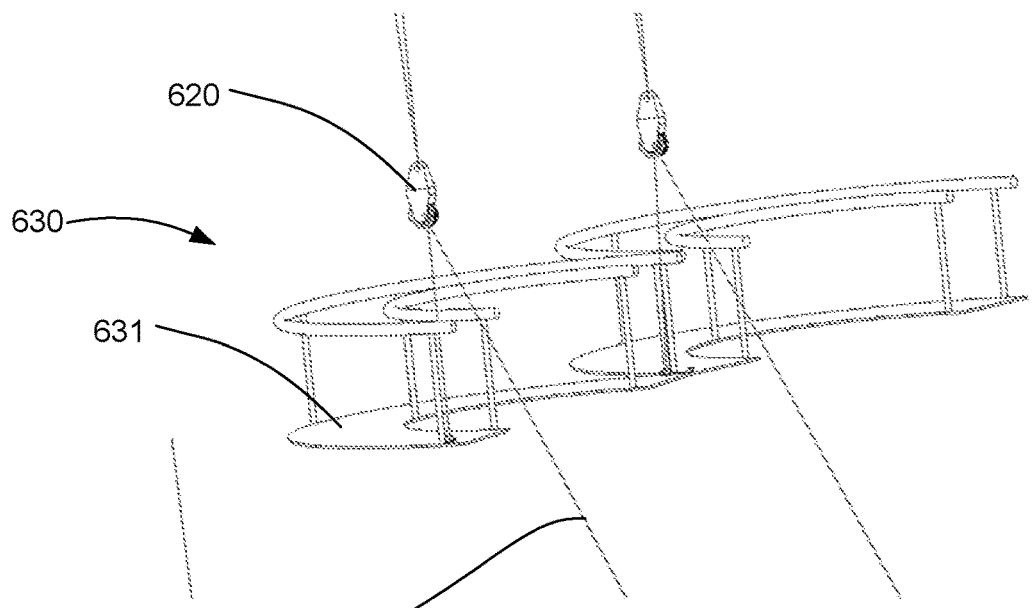

FIG. 7b shows a detailed view of the rotor blade replacement system 6 shown in FIG. 7a where it is seen that the platform 630 is attached to the hoist blocks 620 by a resilient member, connecting the hoist blocks 620 to brackets of the first platform section 631. Thus, the platform 630 can be hoisted from its grounded position to its hoisted position at the same time as the hoist blocks 620 are hoisted to their hoisted position. Thus, the assembly and installation of the rotor blade replacement system 6 is reduced by a hoisting operation.

Figure 8A:
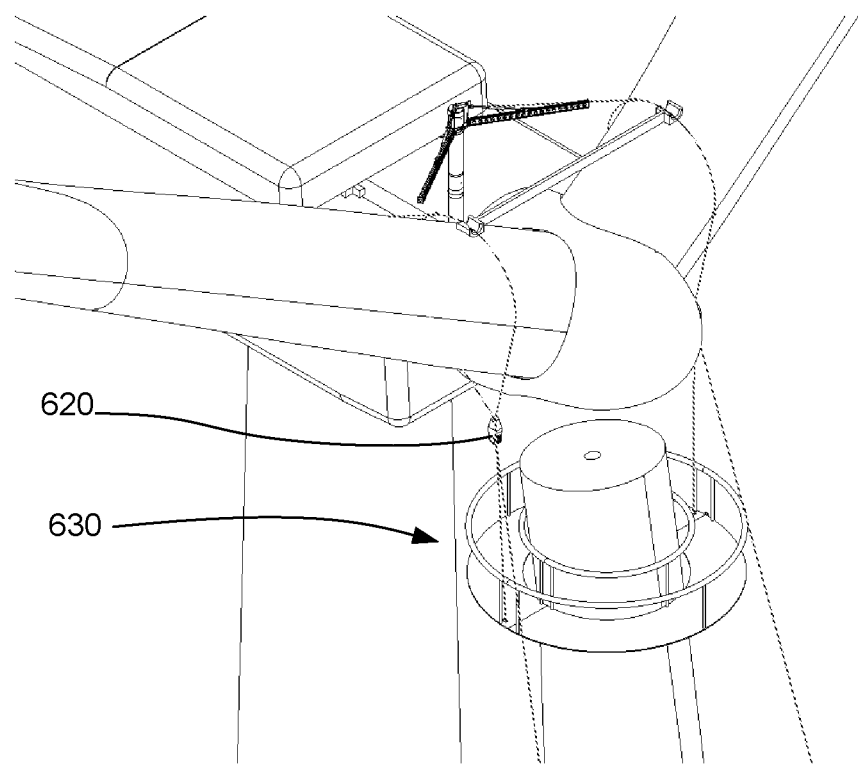
FIGS. 8a and 8b show detailed views of a rotor blade replacement system according to an embodiment of the invention.
Figure 8B:
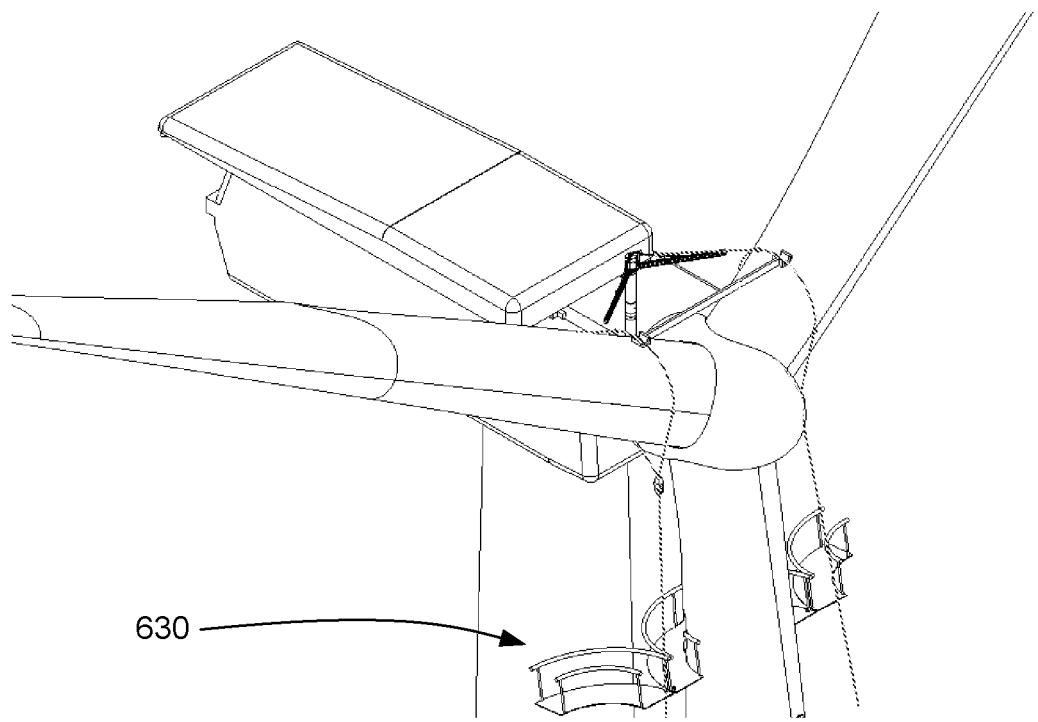

FIG. 8a shows a perspective view of a platform 630 in its hoisted position when it has been closed around the rotor blade 5. FIG. 8b shows a perspective view of a three-section platform 630, as seen in FIG. 6d, in its hoisted position, in its open configuration.

Figure 9:
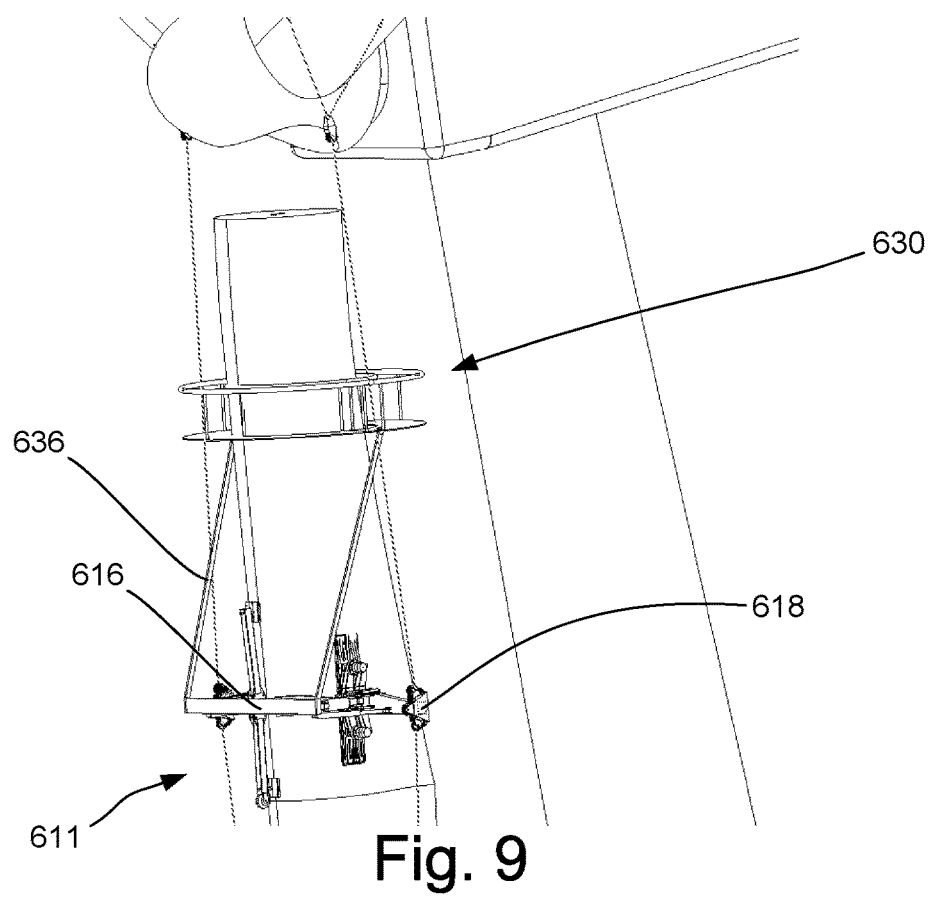
FIGS. 9 and 10 show detailed views of a rotor blade replacement system according to another embodiment of the invention.
Figure 10:
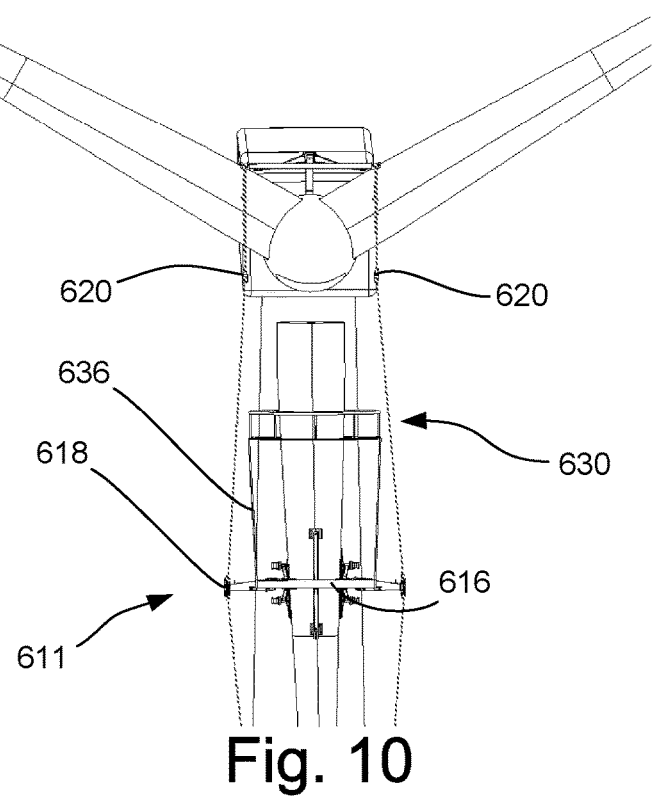

FIGS. 9 and 10 are perspective views of a rotor blade replacement system 6 according to an embodiment of the invention comprising a platform 630. As seen in FIG. 9, the platform 630 is attached to the base section 616 of the first clamp 611 by a rigid connection member 636. In this embodiment, the platform 630 is thus hoisted together with the first clamp 611 in either its open configuration, if hoisted without a rotor blade 5, or in its closed configuration when hoisted together with a rotor blade 5. The rigid connection member 636 could alternately be attached to other parts of the first clamp 611.

FIG. 7b shows a detailed view of the rotor blade replacement system 6 shown in FIG. 7a where it is seen that the platform 630 is attached to the hoist blocks 620 by a resilient member, connecting the hoist blocks 620 to brackets of the first platform section 631. Thus, the platform 630 can be hoisted from its grounded position to its hoisted position at the same time as the hoist blocks 620 are hoisted to their hoisted position. Thus, the assembly and installation of the rotor blade replacement system 6 is reduced by a hoisting operation.

Figure 11:
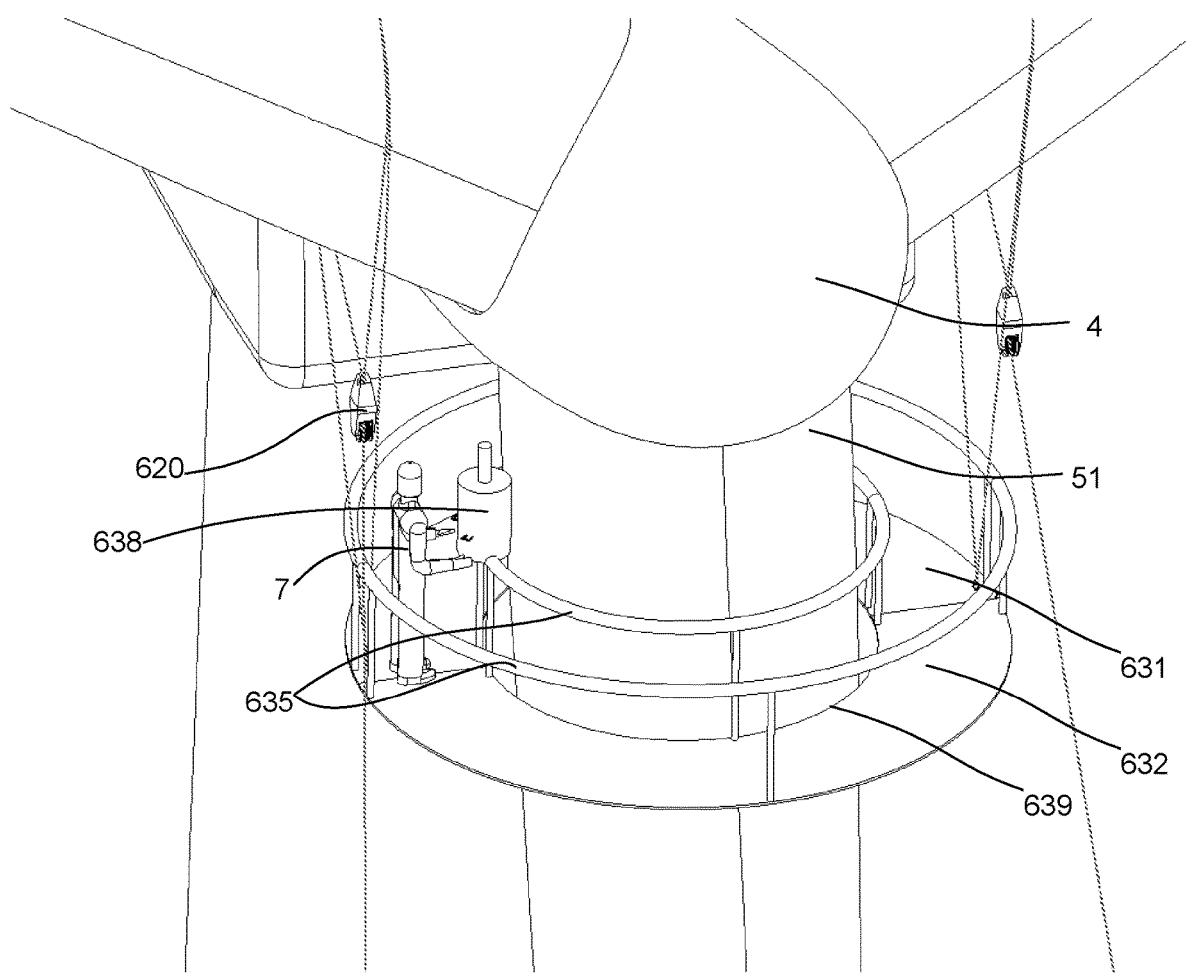
FIG. 11 shows a detailed view of a rotor blade replacement system according to an embodiment of the invention.

FIG. 11 shows a detailed view of a rotor blade replacement system 6 in its hoisted position, where an operator 7 is standing on a platform 630 in its closed configuration around a rotor blade 5. A fastening tool 638 is movably mounted to a rail 635 of the platform 630. The fastening tool 638 can be moved along the rail 635 around at least a part of the platform 630, preferably around the entire length of the rail 635. From this position, the fastening tool 638 can be used to fasten or unfasten fastening means, such as bolts, from the rotor blade 5, rotor blade bearings 53 and/or the rotor hub 4. The operator 7 therefore does not need to lift the heavy equipment, which is traditionally used for fastening bolts to the rotor blade 5, rotor blade bearings 53 and/or the rotor hub 4. It is further seen in FIG. 11 how the guiding element 639 of the platform 630 has guided the first end 51 of the rotor blade 5 towards its installation position at the rotor hub 4.

Figure 12:
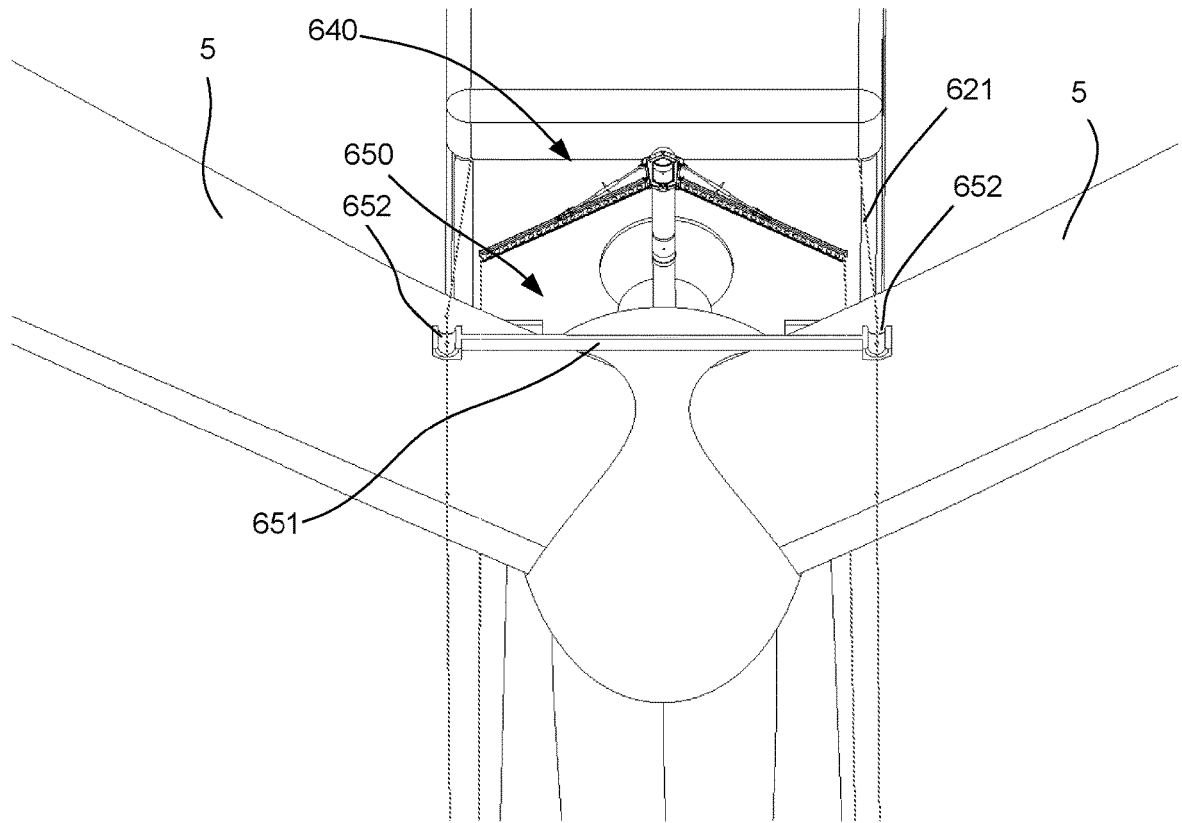
FIGS. 12-15 show detailed views of a rotor blade replacement system according to embodiments of the invention.
Figure 13:
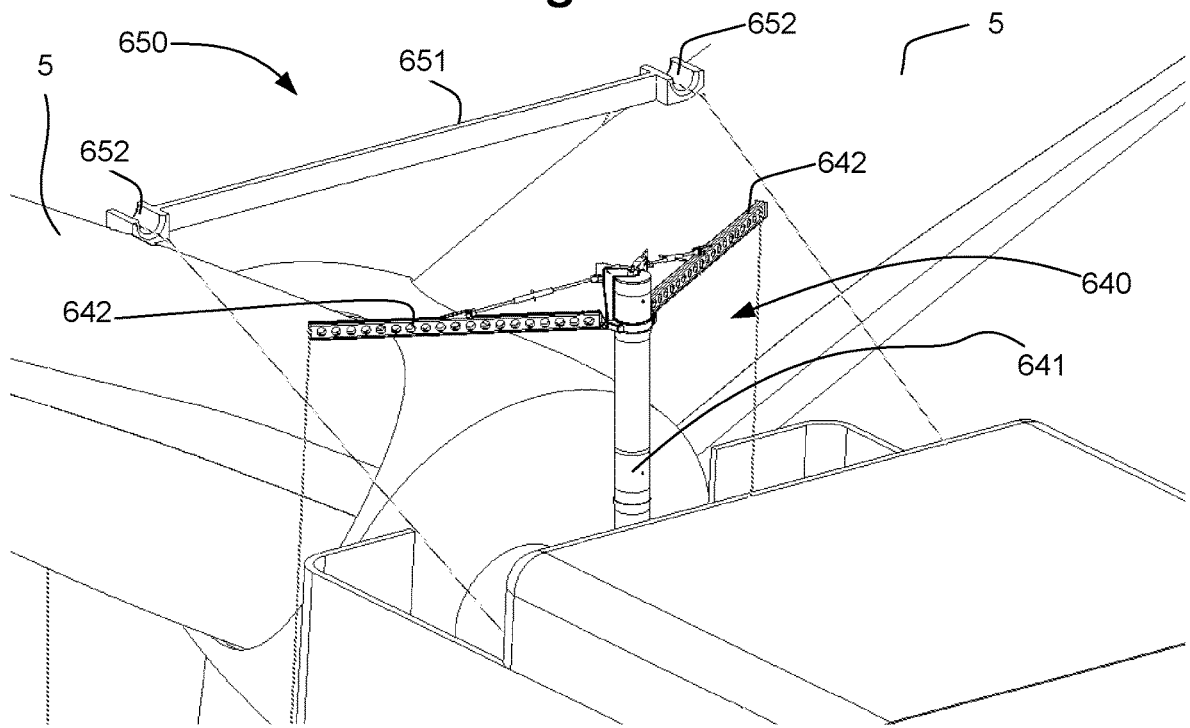

FIGS. 12 and 13 are perspective views the parts of the rotor blade replacement system 6 which are mounted at the top of the wind turbine 1.

The rotor blade replacement system 6 comprises a crane 640 which has a crane column 641 and at least two crane jibs 642. By having two crane jibs 642 placed at an angle to each other, two parts of the rotor blade replacement system 6 can be moved between the hoisted position and the grounded position at the same time. This is advantageous in symmetric systems, such as the system 6 shown in FIGS. 12 and 13. The crane column 641 is mounted to a part of the wind turbine nacelle 3.

The rotor blade replacement system 6 further comprises a spacer element 650, which is positioned between two fixed rotor blades 5. The spacer element 650 comprises a center section 651 and two guide sections 652. The two guide sections 652 are each designed to interact with at least one wire from either the winch 601 placed on the ground, a wire from the crane 640, safety slings holding the platform 630 or hoist block 620 and/or from a hoist block tether 621.

By having the spacer element 650 with the guide sections 651, the wires are prevented from sliding down the slope of the rotor blades 5 they are running over.

Figure 14:
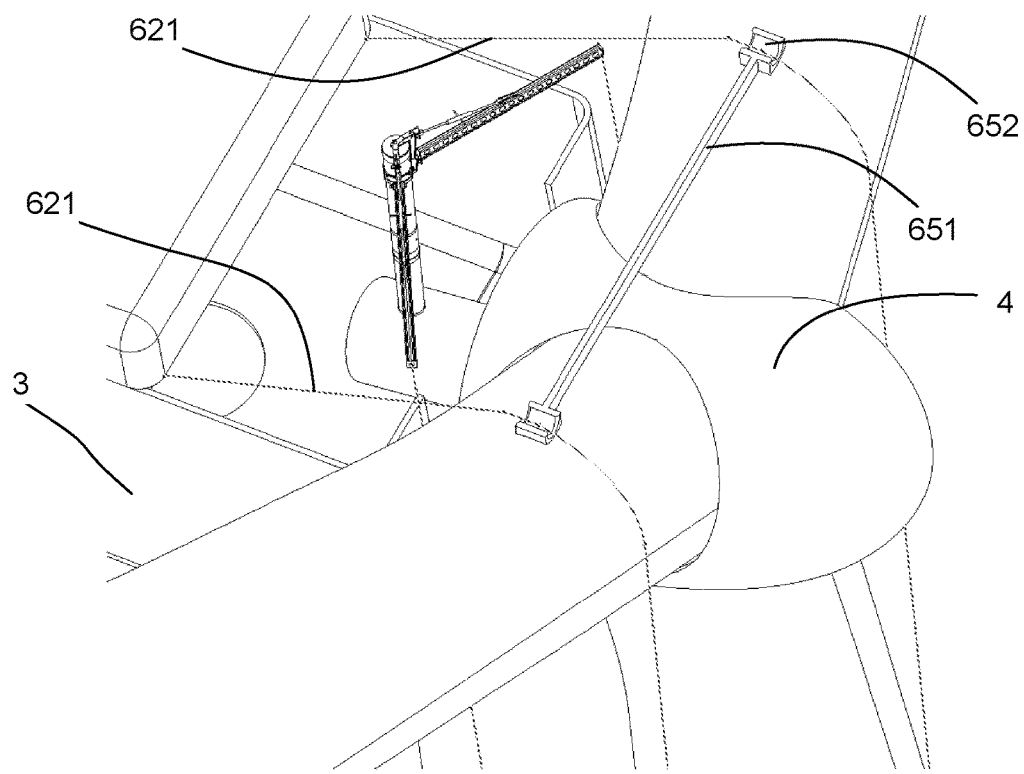
Figure 15:
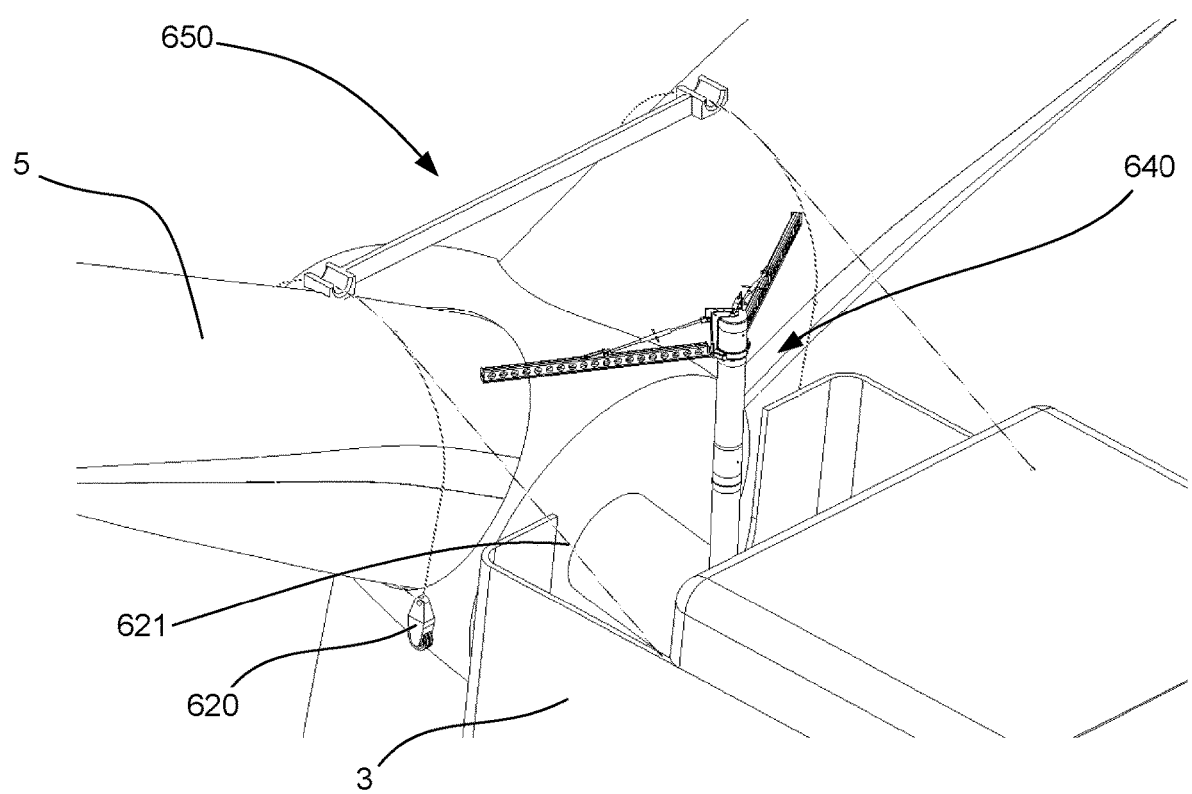

FIGS. 14 and 15 show another perspective view the parts of the rotor blade replacement system 6 which are mounted at the top of the wind turbine 1. Two hoist block tethers 621 are shown being attached at one end to the hoist blocks 620, and at the other end being fixed to a part of the nacelle 3 of the wind turbine 1. The hoist block tether 621 runs over fixed rotor blades 5 and through the guide sections 652 of the spacer element 650.

Figure 16A:
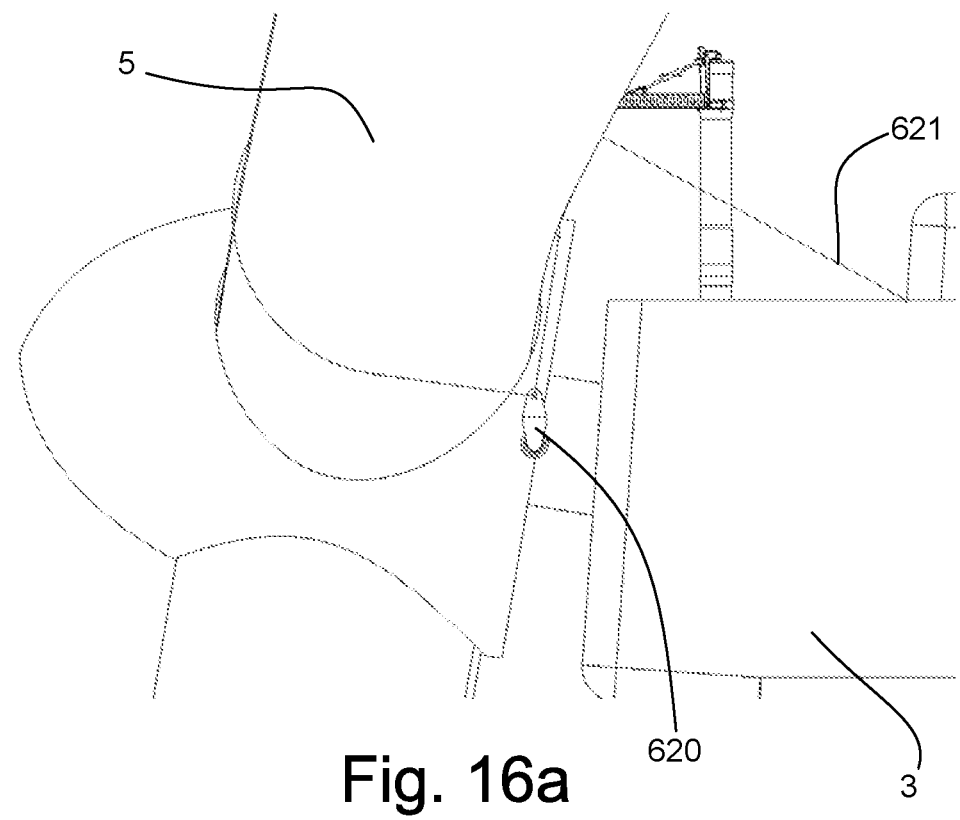
FIGS. 16a-d show detailed views of a rotor blade replacement system according to an embodiment of the invention.
Figure 16B:
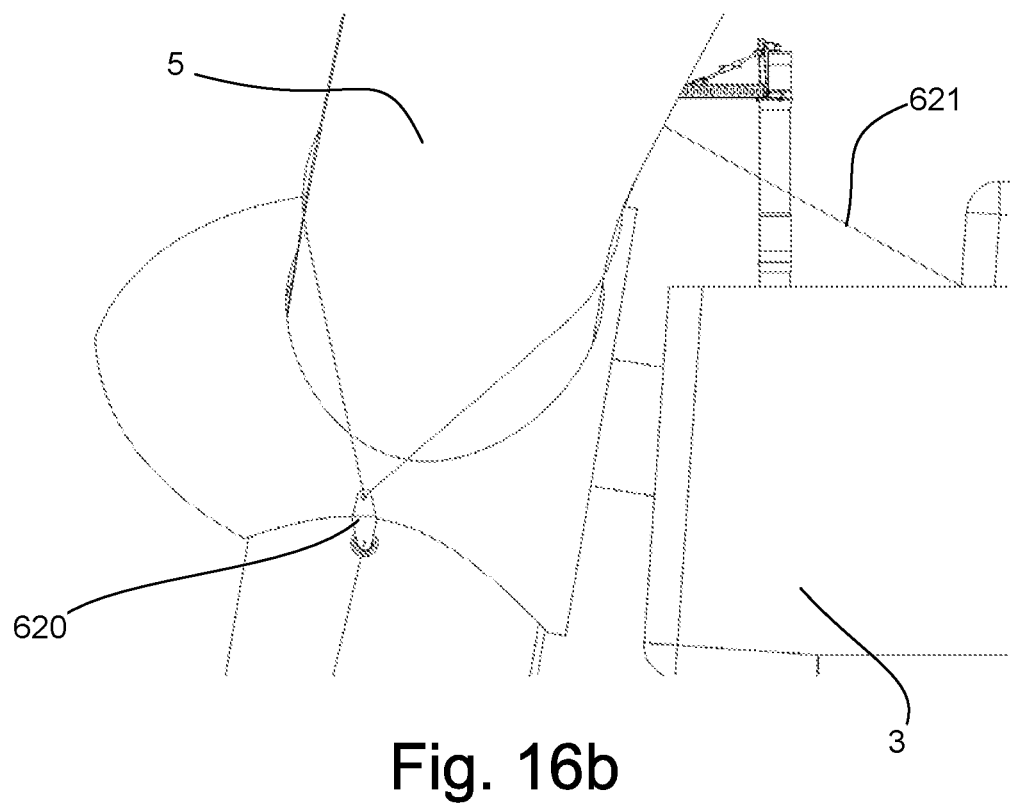
Figure 16C:
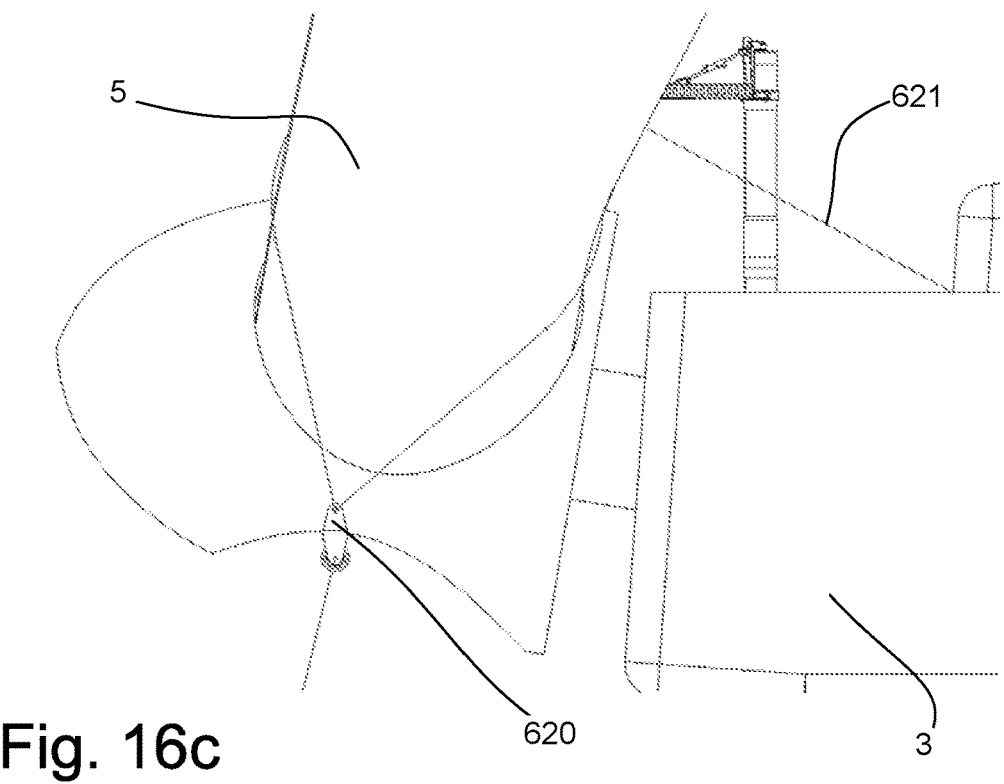
Figure 16D:
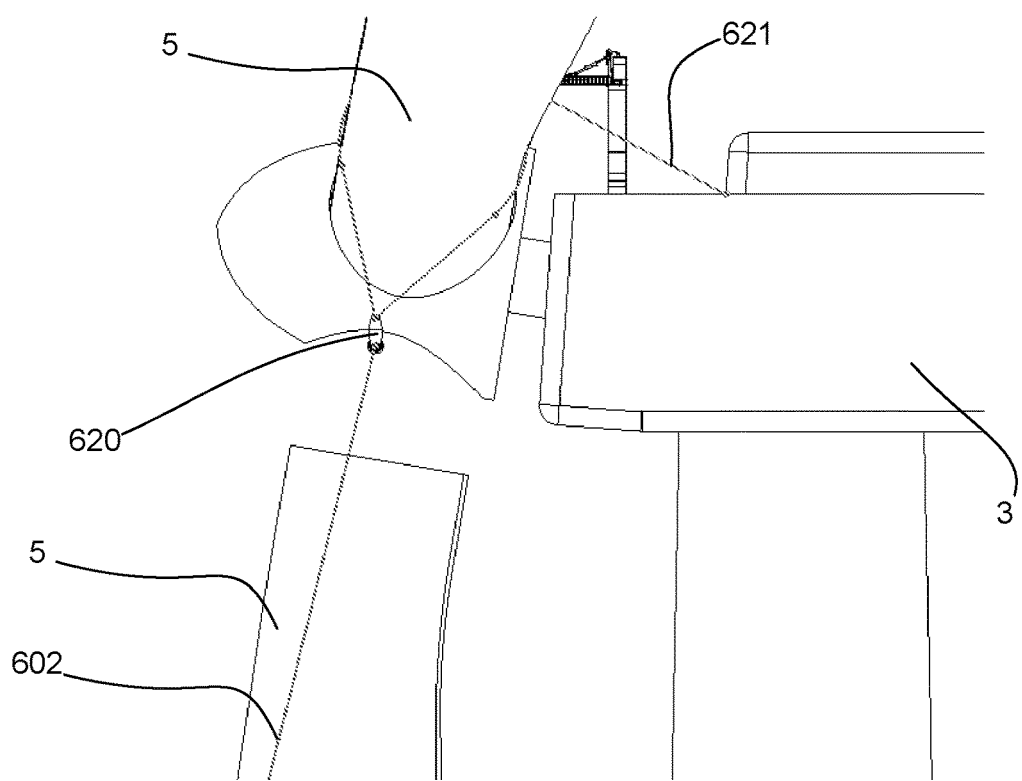

FIGS. 16a to 16d show different positions of a hoist block 620 depending on the length and tension of the hoist block tether 621. FIG. 16a shows the hoist block 620 in its inner most position, which is where it can be, when hoisted from the ground to the hoisted position near the top of the wind turbine 1. By shortening, winding or tightening the hoist block tether 621 the hoist block 620 is moved to the position as shown in FIG. 16b. If the hoist block tether 621 is not present, or is not properly tightened, the natural position of the hoist block 620 would be in line between the center of the rotor blade 5 it is attached to and the load applied by the wire 602 running from the first clamp 611 to the hoist block 620. This will be near vertical when the first clamp 611 is in its ground position. Therefore, the first clamp 611 will not be guided to its correct hoisted position. As seen in FIGS. 16c and 16d, the hoist block tether 621 positions the hoist block 620 in a position to accurately guide the rotor blade 5 attached to the first clamp 611 to its installation position near the rotor hub 4. As seen in FIGS. 16b-16d, this position is not in a vertical line below the center of the fixed rotor blade 5, which the hoist block 620 is attached to.

The invention claimed is:

1. A rotor blade replacement system for mounting and dismounting of a rotor blade of a wind turbine, wherein said rotor blade replacement system comprises a first clamp and a second clamp adapted to be detachably attached to the rotor blade at a first position near an end of the rotor blade which is intended to be attached to a rotor hub and at a second position near a tip of the rotor blade, wherein said first and second clamps comprise substantially U-shaped frame elements, said frame elements having a base portion, a first leg and a second leg, wherein said first and second clamps are displaceable between an open position and a closed position by a first actuator, wherein in the open position a rotor blade portion can pass towards the base portion of the frame elements, and wherein in the closed position, the second leg is displaced towards the first leg, wherein the U-shaped frame element at least partially enclose and clamp the rotor blade, wherein the first leg and the second leg of the first clamp comprise at least one pulley adapted to interact with a wire from a winch on the ground, and wherein at least one of the clamps comprises at least one climbing hoist adapted to interact with the wire from the winch placed on the ground, and at least two hoist blocks adapted to be mounted on the rotor hub or at least one rotor blade of the wind turbine.

2. The rotor blade replacement system according to claim 1, wherein said first leg is fixed to the base portion, and said second leg is rotatably and lockably mounted to the base portion of the frame elements, wherein said second leg is displaceable between an open position and a closed position by a first actuator, wherein, in the open position, the rotor blade portion can pass towards the base portion of the frame elements, and wherein, in the closed position, the second leg is displaced towards the first leg, wherein the U-shaped frame element at least partially encloses and clamps the rotor blade.

3. The rotor blade replacement system according to claim 1, wherein a resilient element is adapted to run from each of the at least two hoist blocks and around at least one of a rotor hub or rotor blade and connect to each of said at least two hoist blocks.

4. The rotor blade replacement system according to claim 3, wherein the platform is attached to at least one of the hoist blocks or the first clamp in the first position.

5. The rotor blade replacement system according to claim 1, wherein the system further comprises a platform which is adapted to be positioned under the rotor hub, such that a person standing on the platform can at least one of attach or detach fastening means from a part of a wind turbine.

6. The rotor blade replacement system according to claim 1, said system comprising a jib crane having two jibs, extending from a same crane column, at an angle relative to each other, said jib crane being adapted to be mounted on a part of a wind turbine nacelle for lifting components of the rotor blade replacement system from a position on the ground to a position near a mounting location for the component.

7. The rotor blade replacement system according to claim 1, wherein the system further comprises a spacer element adapted to be placed between two rotor blades of a wind turbine, wherein the spacer element is rigid and maintains a substantially constant distance between the rotor blades it is adapted to be placed between, wherein the spacer element comprises a center section and two guide sections, said guide sections being positioned at each end of the center section, and wherein one surface of each guide section is adapted to abut a rotor blade and another surface of each guide section is adapted to guide a wire from a winch either located on the ground or attached to a wind turbine nacelle.

8. The rotor blade replacement system according to claim 1 comprising a hoist block tether attached at one end to a wire attached to a hoist block, and wherein the hoist block tether is adapted to be attached to a stationary part of a wind turbine at another end, wherein the hoist block tether is configured to position the hoist block in relation to the rotor hub by adjusting the tension of the hoist block tether.

* * * * *